United States Patent
Zastrow et al.

(10) Patent No.: US 9,301,451 B2
(45) Date of Patent: Apr. 5, 2016

(54) GRAIN BAG UNLOADING DEVICE

(71) Applicants: Lee Zastrow, Wessington Springs, SD (US); Rex Zastrow, Wessington Springs, SD (US)

(72) Inventors: Lee Zastrow, Wessington Springs, SD (US); Rex Zastrow, Wessington Springs, SD (US)

( * ) Notice: Subject to any disclaimer, the term of this patent is extended or adjusted under 35 U.S.C. 154(b) by 0 days.

(21) Appl. No.: 14/455,267

(22) Filed: Aug. 8, 2014

(65) Prior Publication Data
US 2016/0037727 A1 Feb. 11, 2016

(51) Int. Cl.
| | |
|---|---|
| *B65G 65/02* | (2006.01) |
| *B65G 65/46* | (2006.01) |
| *B65G 33/08* | (2006.01) |
| *A01F 25/20* | (2006.01) |
| *B65G 65/06* | (2006.01) |

(52) U.S. Cl.
CPC ............... *A01F 25/20* (2013.01); *B65G 33/08* (2013.01); *B65G 65/02* (2013.01); *B65G 65/46* (2013.01); *A01F 2025/2045* (2013.01); *B65G 65/06* (2013.01)

(58) Field of Classification Search
CPC ........ B65G 65/02; B65G 65/06; B65G 65/40; B65G 65/42; B65G 65/425; B65G 65/44; B65G 65/46; B65G 65/466; B65G 33/08; B65G 33/10; A01F 25/20; A01F 25/14; A01F 25/2027; A01F 25/2036; A01F 25/2045
USPC ........................ 198/308.1, 309, 314, 513, 519
See application file for complete search history.

(56) References Cited

U.S. PATENT DOCUMENTS

| | | | |
|---|---|---|---|
| 2,625,001 A | 1/1953 | Heun | |
| 3,724,635 A | 4/1973 | Byrd | |
| 5,769,590 A | 6/1998 | Weikel | |
| 6,109,552 A | 8/2000 | Strankman | |
| 7,861,851 B2 | 1/2011 | Dekoning | |
| 2008/0290199 A1* | 11/2008 | Schertz | A01F 25/2027 241/101.762 |
| 2009/0263223 A1* | 10/2009 | Twiestmeyer | A01F 25/20 414/584 |
| 2011/0226589 A1* | 9/2011 | Bartolome Gaviglio | A01F 25/20 198/518 |
| 2012/0189413 A1* | 7/2012 | Richiger | A01F 25/20 414/310 |
| 2013/0031739 A1* | 2/2013 | Stumpe | A01F 25/20 15/246.2 |
| 2013/0177372 A1 | 7/2013 | de Koning | |

FOREIGN PATENT DOCUMENTS

AU    WO 2010031145 A1 *  3/2010  ............. A01F 25/14

* cited by examiner

Primary Examiner — Mark A Deuble (57) ABSTRACT

A grain bag unloading device which is compact and reduces farm operating expenses by unloading grain from an elongated grain bag to a position adjacent to the grain bag such that the grain may be further moved using an existing grain elevator or the like. The device includes a spool coupled to a frame. An actuator rotates the spool to pull a grain bag onto the spool. Wheels facilitate movement of the frame as the grain bag is pulled onto the spool. A gathering mechanism urges grain in the grain bag towards a collection area. A first end of a collector is operationally coupled to the gathering mechanism such that the collector is dispenses the grain from the collection area.

17 Claims, 7 Drawing Sheets

GRAIN BAG UNLOADING DEVICE

BACKGROUND OF THE DISCLOSURE

Field of the Disclosure

The disclosure relates to unloading devices and more particularly pertains to a new unloading device which is compact and reduces farm operating expenses by unloading grain from an elongated grain bag to a position adjacent to the grain bag such that the grain may be further moved using an existing grain elevator or the like.

SUMMARY OF THE DISCLOSURE

An embodiment of the disclosure meets the needs presented above by generally comprising a spool coupled to a frame. An actuator rotates the spool to pull a grain bag onto the spool. Wheels facilitate movement of the frame as the grain bag is pulled onto the spool. A gathering mechanism urges grain in the grain bag towards a collection area. A first end of a collector is operationally coupled to the gathering mechanism such that the collector is dispenses the grain from the collection area.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 7 thereof, a new unloading devices embodying the principles and concepts of an embodiment of the disclosure and generally designated by the reference numeral 10 will be described.

As best illustrated in FIGS. 1 through 7, the grain bag unloading device 10 generally comprises a frame 12 and a pair of spools 14. Each spool 14 is coupled to the frame 12. Each spool 14 is rotatable on a horizontally oriented axis wherein the spools 14 are configured for being attached to or engaging a grain bag 18 of the type which are elongated and hold loose grain 16. As is conventionally known, the grain bag 18 is unloadable by opening the grain bag 18 and running an unloading machine along the length of the grain bag 18. In the present invention, the grain bag 18 is split and rolls onto the spools 14 when the spools 14 are rotated. In the present invention, rotation of the spools 14 provides force to pull the frame 12 along the length of the grain bag 18. Each of the spools 14 is independently rotatable and engaged to a respective portion of the grain bag 18 such that differences in rotation of the spools 14 urges the frame 12 to twist relative to the grain bag 18. Each of the spools 14 may be rotatable at a variable speed through conventional mechanical connections and controls. Each of a pair of wheels 20 is coupled to the frame 12 wherein the frame 12 is configured to move towards a distal end 22 of the grain bag 18 relative to the frame 12 as the grain bag 18 is pulled onto the spools 14.

A gathering mechanism 24 is coupled to the frame 12 and positioned forwardly of the wheels 20 and spools 14 such that the gathering mechanism 24 is configured for positioning in the grain bag 18 to gather grain 16 into a collection area 28. The gathering mechanism 24 is a pair of augers 30. The collection area 28 is positioned between the augers 30. The augers 30 are linearly aligned extending transversely relative to the length of the grain bag 18. Each spool 14 is elevated relative to the gathering mechanism 24.

A collector 32 is coupled to the frame 12. The collector 32 has a first end 34 operationally coupled to the gathering mechanism 24 such that the collector 32 collects the grain 16 from the collection area 28 into the first end 34. The collector 32 has a second end 36 positioned in spaced relationship to the first end 34 such that the collector 32 is configured for dispensing the grain 16 outside of the grain bag 18. However, as opposed to known devices currently used for unloading grain, the collector 32 has a relatively short length such that the second end 36 is not positioned substantially outside a footprint of the frame 12. The collector 32 is sized minimally to deliver the grain 16 to a position adjacent to the frame 12 where an extrinsic pre-existing grain elevator 38 may be used to carry and deliver the grain 16 to a desired point such as a to a truck 40 for transport. The collector 32 as shown is a paddle conveyor 42. The collector 32 may alternatively be an auger, vacuum tube, or the like capable of removing the grain 16 from the collection area 28.

Figure 1:
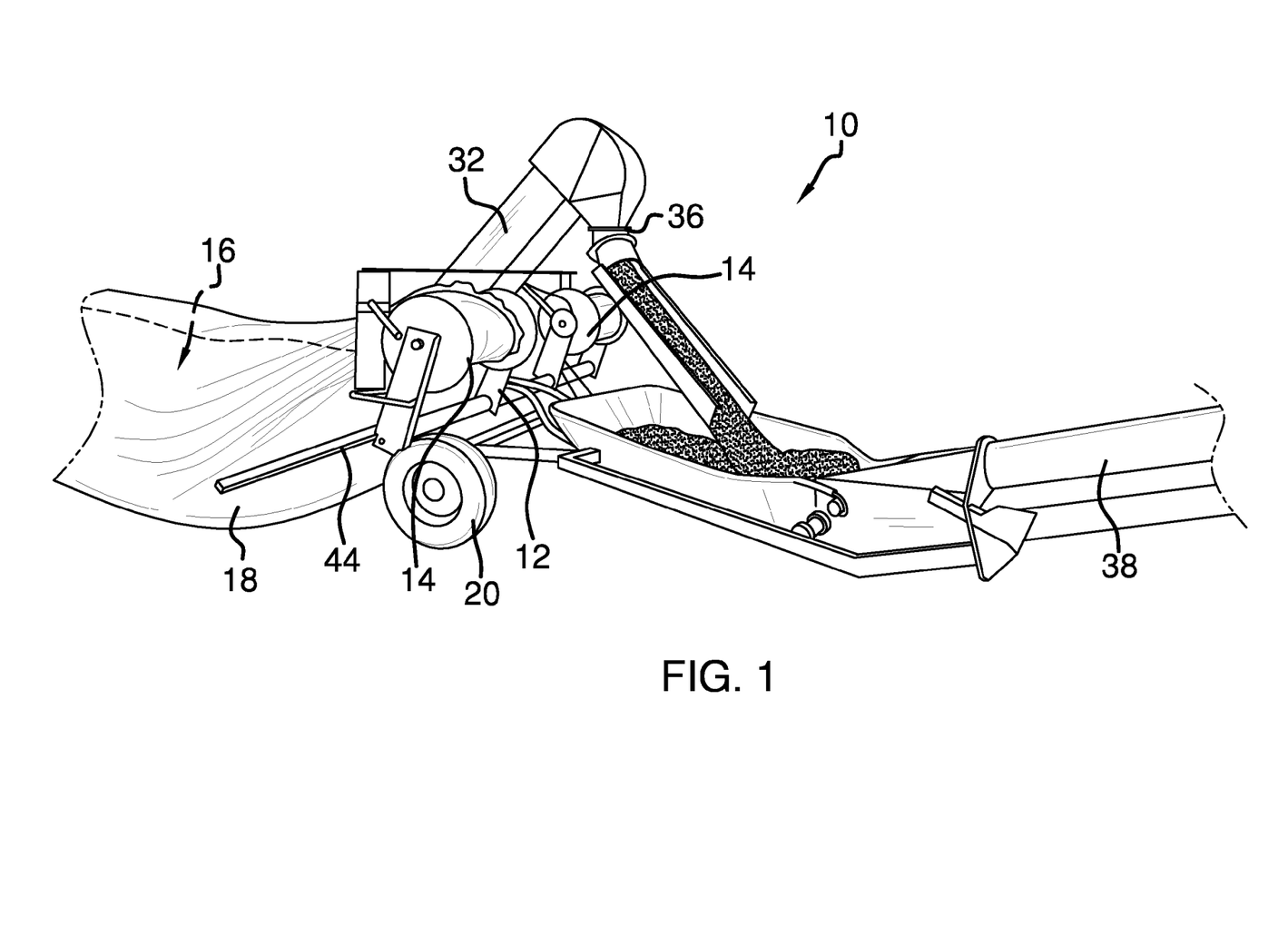
FIG. 1 is a top rear side perspective view of a grain bag unloading device according to an embodiment of the disclosure.
Figure 2:
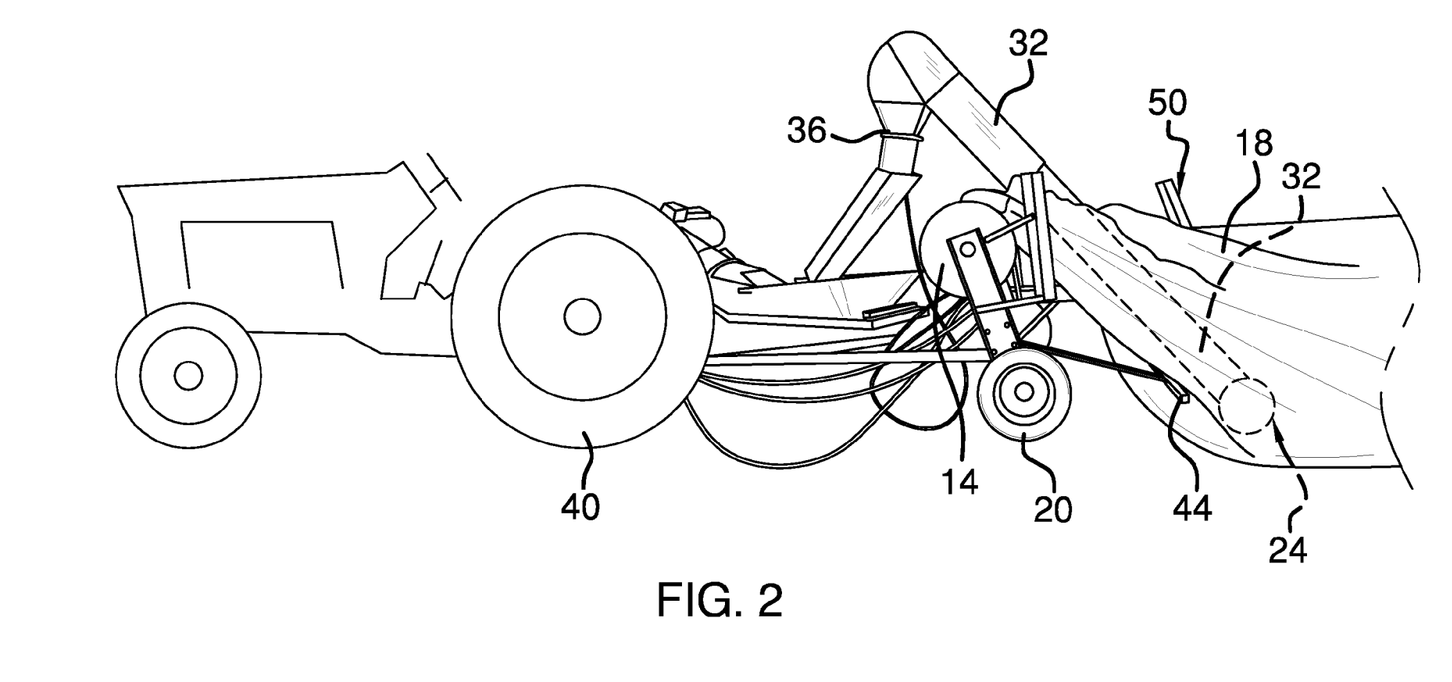
FIG. 2 is a side view of an embodiment of the disclosure in use.
Figure 3:
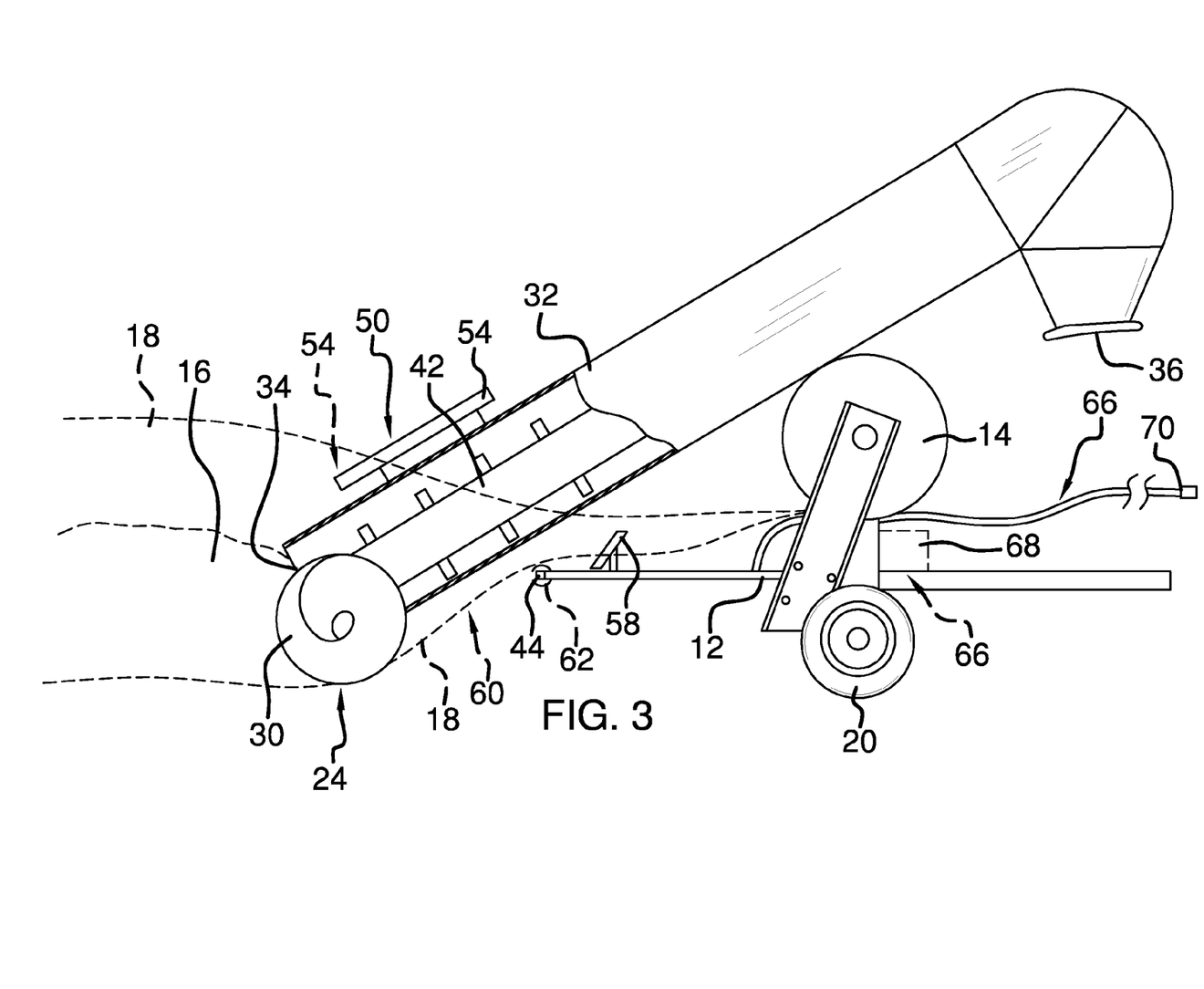
FIG. 3 is a partial cut-away side view of an embodiment of the disclosure.

As shown particularly in FIG. 3, a bar 44 is positioned between the gathering mechanism 24 and each spool 14 such that the bar 44 is configured to support a section 46 of the grain bag 18 at an inclined angle extending upwardly and away from the gathering mechanism 24 and towards each spool 14. The bar 44 is positioned such that grain 16 initially escaping the gathering mechanism 24 is supported on the section 46 of the grain bag 18 and gravitationally urged back towards the gathering mechanism 24. Elevation of the spools 14 and the bar 44 ensures the grain bag 18 is elevated when drawn past the gathering mechanism 24 to prevent grain 16 from escaping the gathering mechanism 24 and the collector 32. A roller 62, as shown coupled to the bar 44 in FIG. 3, may be utilized to facilitate the grain bag 18 moving over the bar 44. Positioning of the bar 44 may achieve optimal angling of the grain bag 18 extending away from the gathering mechanism 24 to balance the pulling force of the spools 14 with gravitationally urging grain 16 back towards the gathering mechanism 24. The angle at which the grain bag 18 extends away from the gathering mechanism may be between 20 and 70 degrees.

A splitter 50 is coupled to the frame 12 to engage and split the grain bag 18 into respective portions 52 engaged by each spool 14. The splitter 50 comprises an first piece 54 positioned forwardly of the collector 32 to split the grain bag 18 along a top side 56 of the grain bag 18. The splitter 50 comprises a second piece 58 positioned to split a bottom side 60 of the grain bag 18 after the grain bag 18 passes over the bar 44 preventing the grain bag 18 from being split along the bottom side 60 of the grain bag 18 prior to collection of the grain 16.

An actuator 66 is operationally coupled to each spool 14 such that the actuator 66 rotates each spool 14. The actuator 66 is defined generally as a mechanism to provide power to the spools 14 and may be self contained and coupled to the frame 12 such as a motor 68, engine, or the like. Alternatively, the actuator 66 may be a connector 70 such as a hydraulic port, hydraulic line, or the like to allow for operational coupling of the spools 14 to an extrinsic power source such as a hydraulic system or power take off of a tractor 90 or the like. The actuator 66 may be operationally coupled to the gathering mechanism 24 and the collector 32. Conventional controls may be provided for separate operation and control of the gathering mechanism 24, collector 32, and spools 14.

Figure 4:
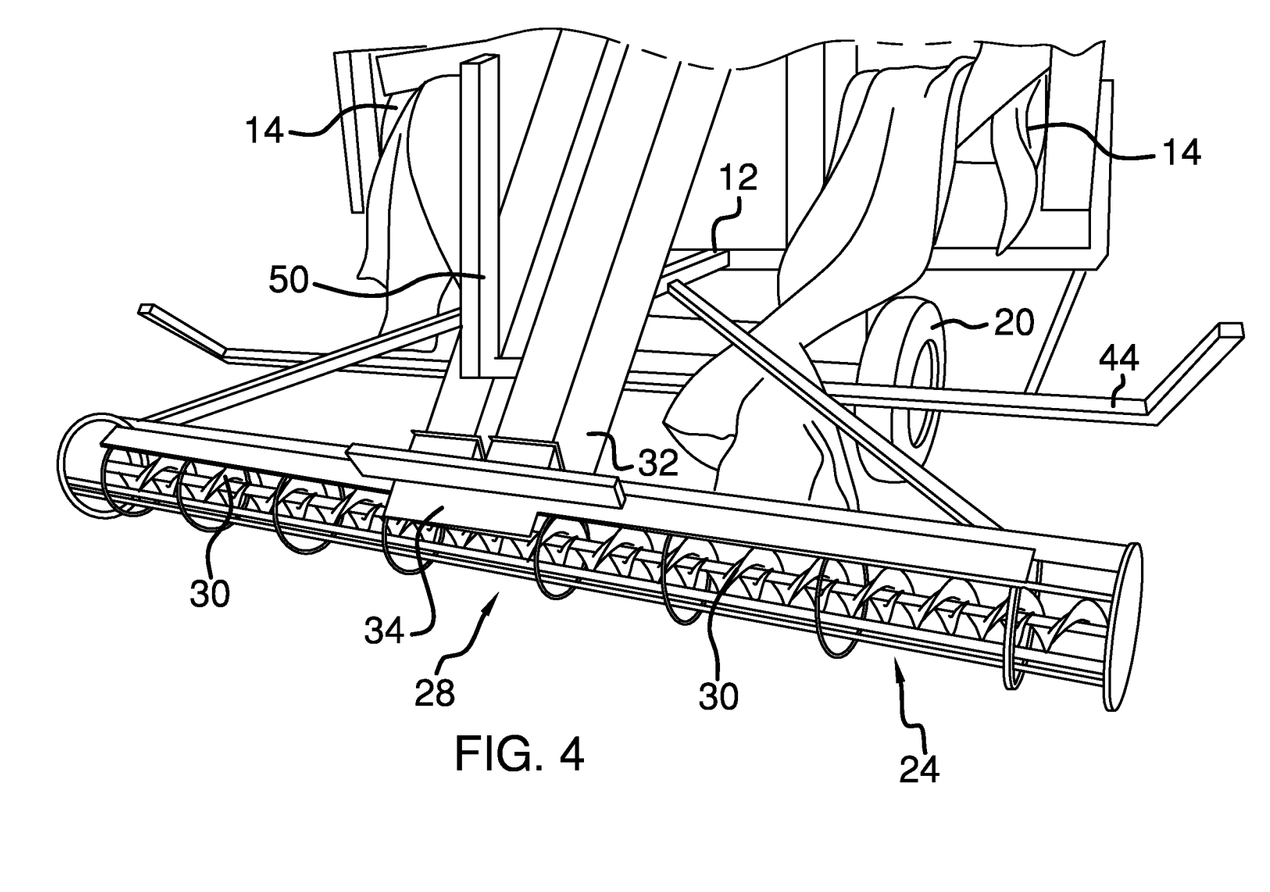
FIG. 4 is a front view of an embodiment of the disclosure.
Figure 7:
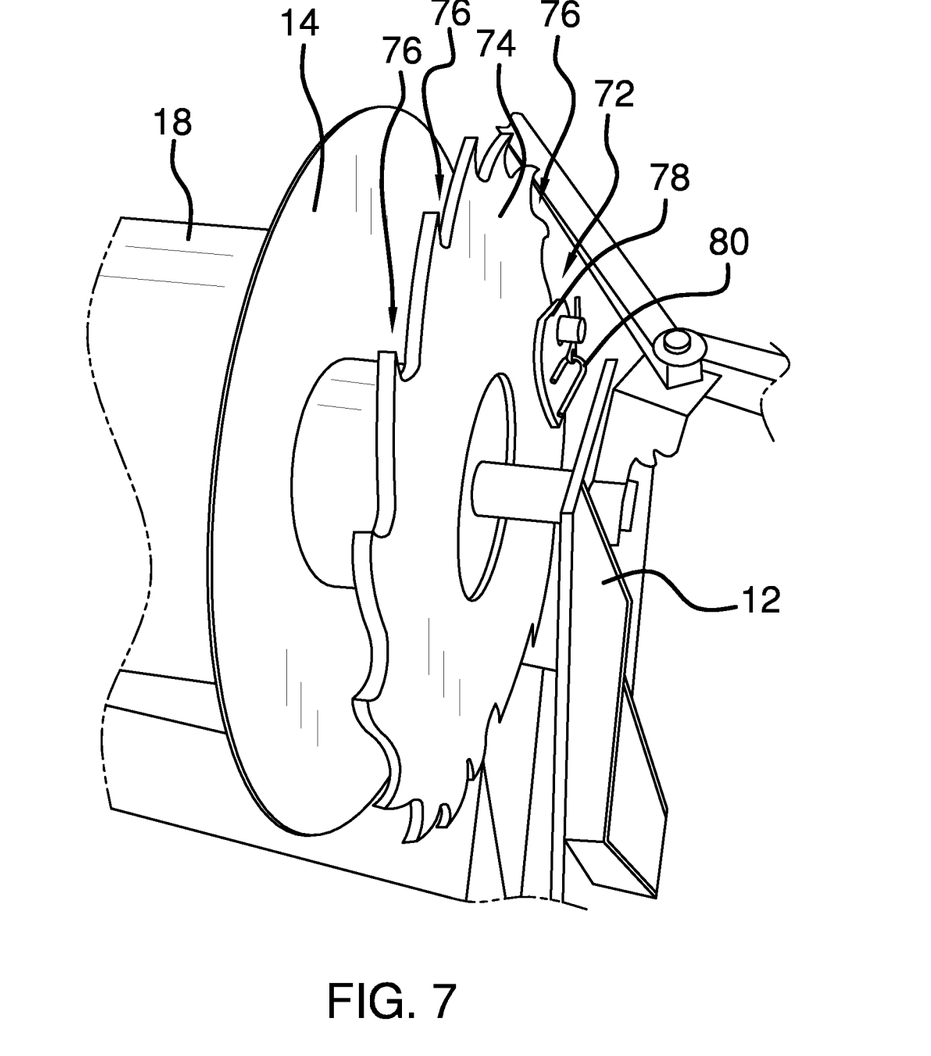
FIG. 7 is a top front side perspective view of a ratchet assembly of an embodiment of the disclosure.

As shown in FIG. 7, each of a pair of ratchet mechanisms 72 is coupled to an associated one of the spools 14 such that the ratchet mechanism 72 prevents the associated spool 14 from rotating in a reverse direction. Each ratchet mechanism 72 comprises a ratchet gear 74 being coupled to the associated one of the spools 14. Each ratchet gear 74 has a plurality of notches 76 as shown in FIG. 4. A pawl 78 is coupled to the frame 12 and positioned to engage the ratchet gear 74. A biasing member 80 such as a resilient cord or strap may be used to prevent the pawl 78 from disengaging from the ratchet gear 74. The notches 76 may be spaced such that engagement of each notch 76 by the pawl 78 corresponds to between 7 and 14 centimeters of forward movement of the frame 12.

Figure 5:
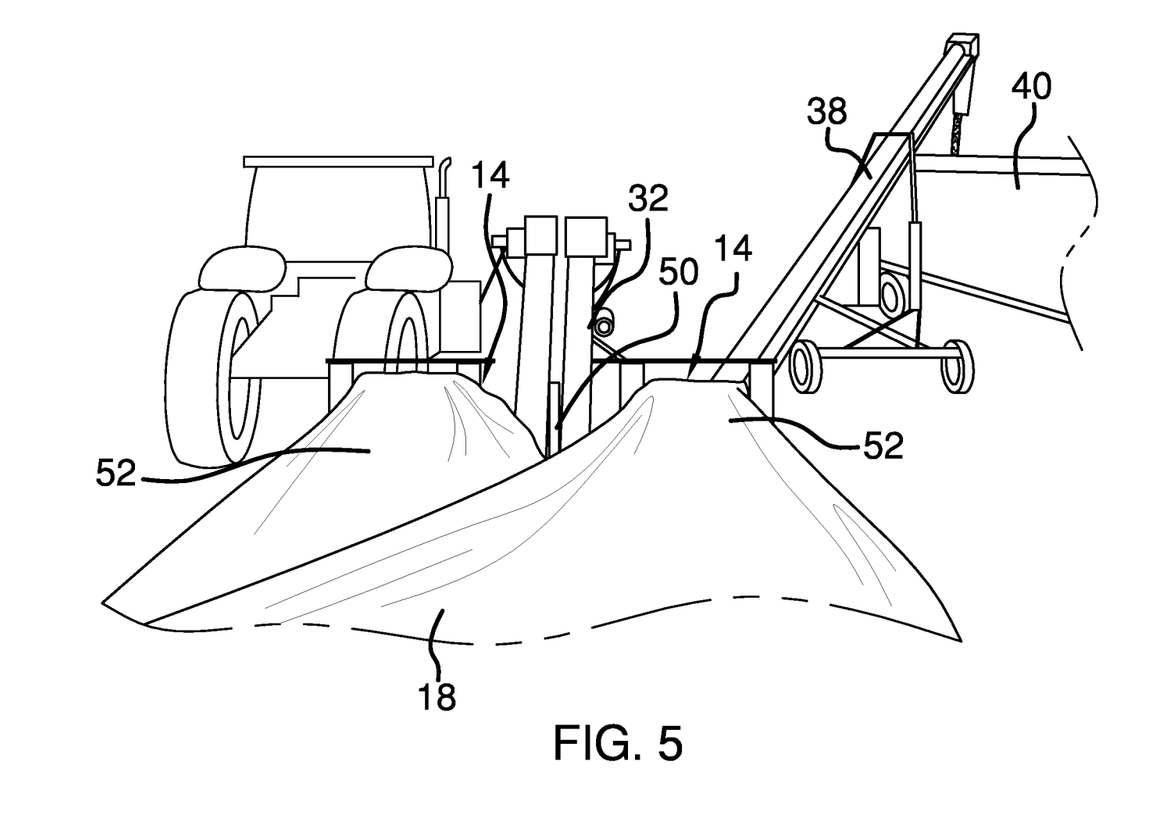
FIG. 5 is a front view of an embodiment of the disclosure in use.
Figure 6:
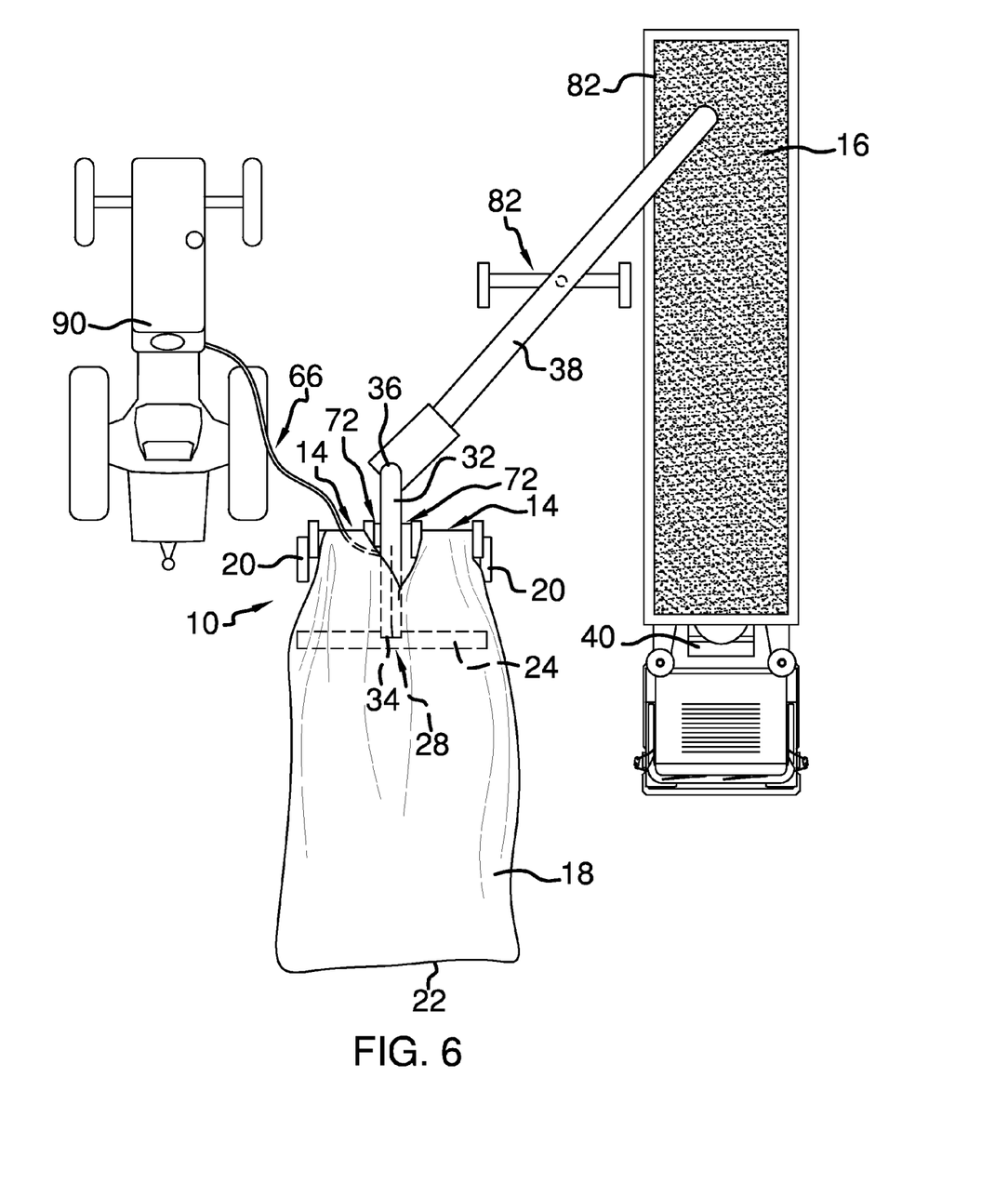
FIG. 6 is a top view of an embodiment of the disclosure.

In use, as shown in FIGS. 5 and 6, the device 10 is positioned adjacent to the grain bag 18 with the gathering mechanism 24 extending into the grain bag 18. The grain bag 18 is initially split and coupled to each spool 14. The gathering mechanism 24, collector 32 and spools 14 are activated to gather, collect, and remove the grain 16 from the grain bag 18. The spools 14 rotate to load the split grain bag 18 onto the spools 14 and move the frame 12 towards the distal end 22 of the grain bag 18. Steering of the frame 12 as needed is achieved by controlling rotation of the spools 14 while the ratchet mechanisms 72 prevent backward movement of the frame 12 away from the distal end 22 of the grain bag 18. The existing mobile elevator 38, such as is commonly found on farms, receives the grain 16 unloaded from the grain bag 18. A steering mechanism 84 may be coupled to the existing elevator 80 allowing the elevator 80 to extend laterally relative to the grain bag 18. Thus, trailers 82 may be run successively along a side of the grain bag 18 with the frame 12 as needed to receive and transport the grain 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A grain bag unloading device comprising:

a frame;

a spool, said spool being coupled to said frame, said spool being rotatable wherein said spool is configured for engaging and rolling a grain bag onto said spool, said frame being urged towards a distal end of the grain bag by rotation of said spool;

a gathering mechanism coupled to said frame such that said gathering mechanism is configured for positioning in the grain bag to gather grain into a collection area, said spool being elevated relative to said gathering mechanism;

a collector coupled to said frame, said collector having a first end operationally coupled to said gathering mechanism such that said collector is configured for collecting the grain from the collection area and into said first end, said collector having a second end positioned in spaced relationship to said first end wherein said collector is configured for dispensing the grain outside of the grain bag; and a bar positioned between said gathering mechanism and said spool such that said bar is configured to support a section of the grain bag at an inclined angle extending upwardly and away from the gathering mechanism and towards the spool such that grain is on the grain bag between said gathering mechanism and said bar is gravitationally urged towards said gathering mechanism.

2. The device of claim 1, further comprising:

said spool being one of a pair of spools, each said spool being elevated relative to said gathering mechanism; and said bar positioned between said gathering mechanism and each said spool such that said bar is configured to support the section of the grain bag at an inclined angle extending upwardly and away from the gathering mechanism and towards each said spool such that grain supported on the section of the grain bag is gravitationally urged towards said gathering mechanism.

3. The device of claim 2, further comprising a splitter coupled to said frame such that said splitter is configured to engage and split the grain bag into respective portions engaged by each said spool.

4. The device of claim 2, further comprising an actuator operationally coupled to each said spool such that said actuator rotates each said spool.

5. The device of claim 2, further comprising said actuator being a motor coupled to said frame.

6. The device of claim 2, further comprising said actuator being a hydraulic connector configured for operational connection to an extrinsic hydraulic system such that movement of said spools is powered by the extrinsic hydraulic system.

7. The device of claim 2, further comprising said gathering mechanism being a pair of augers, said collection area being positioned between said augers.

8. The device of claim 7, further comprising said augers being linearly aligned.

9. The device of claim 2, further comprising said collector being a paddle conveyor.

10. The device of claim 2, further comprising each of said spools being independently rotatable.

11. The device of claim 10, further comprising each of said spools being rotatable at a variable speed.

12. A grain bag unloading device comprising:
a frame;
a pair of spools, each said spool being coupled to said frame, each said spool being rotatable wherein said spools are configured for engaging and rolling a grain bag onto said spools;
a pair of wheels coupled to said frame wherein said frame is configured to move towards a distal end of the grain bag relative to the frame as the grain bag is pulled onto said spools;
a gathering mechanism coupled to said frame such that said gathering mechanism is configured for positioning in the grain bag to gather grain into a collection area;
a collector coupled to said frame, said collector having a first end operationally coupled to said gathering mechanism such that said collector is configured for collecting the grain from the collection area and into said first end, said collector having a second end positioned in spaced relationship to said first end wherein said collector is configured for dispensing the grain outside of the grain bag; and
a pair of ratchet mechanisms, each said ratchet mechanism being coupled to an associated one of said spools such that said ratchet mechanism prevents said associated spool from rotating in a reverse direction.

13. The device of claim 12, further comprising each said ratchet mechanism comprising:
a ratchet gear being coupled to said associated one of said spools; and
a pawl being coupled to said frame and positioned to engage said ratchet gear.

14. The device of claim 13, further comprising each ratchet gear having a plurality of notches, said notches being spaced such that engagement of each notch corresponds to between 7 and 14 centimeters of forward movement of said frame.

15. A grain bag unloading device comprising:
a frame;
a pair of spools, each said spool being coupled to said frame, each said spool being rotatable wherein said spools are configured for engaging and rolling a grain bag onto said spools, each of said spools being independently rotatable, each of said spools being rotatable at a variable speed;
a pair of wheels coupled to said frame wherein said frame is configured to move towards a distal end of the grain bag relative to the frame as the grain bag is pulled onto said spools;
a gathering mechanism coupled to said frame such that said gathering mechanism is configured for positioning in the grain bag to gather grain into a collection area, said gathering mechanism being a pair of augers, said collection area being positioned between said augers, said augers being linearly aligned, each said spool being elevated relative to said gathering mechanism;
a collector coupled to said frame, said collector having a first end operationally coupled to said gathering mechanism such that said collector is configured for collecting the grain from the collection area and into said first end, said collector having a second end positioned in spaced relationship to said first end wherein said collector is configured for dispensing the grain outside of the grain bag, said collector being a paddle conveyor; and
a bar positioned between said gathering mechanism and each said spool such that said bar is configured to support a section of the grain bag at an inclined angle extending upwardly and away from the gathering mechanism and towards each said spool such that grain supported on the section of the grain bag is gravitationally urged towards said gathering mechanism;
a splitter coupled to said frame such that said splitter is configured to engage and split the grain bag into respective portions engaged by each said spool;
an actuator operationally coupled to each said spool such that said actuator rotates each said spool; and
a pair of ratchet mechanisms, each said ratchet mechanism being coupled to an associated one of said spools such that said ratchet mechanism prevents said associated spool from rotating in a reverse direction, each said ratchet mechanism comprising
a ratchet gear being coupled to said associated one of said spools, each ratchet gear having a plurality of notches, and
a pawl being coupled to said frame and positioned to engage said ratchet gear, said notches being spaced such that engagement of each notch by said pawl corresponds to between 7 and 14 centimeters of forward movement of said frame.

16. The device of claim 15, further comprising said actuator being a motor coupled to said frame.

17. The device of claim 15, further comprising said actuator being a hydraulic connector configured for operational connection to an extrinsic hydraulic system such that movement of said spools is powered by the extrinsic hydraulic system.

* * * * *